J. Johnson.
Sap Spout.

N° 86,553.  Patented Feb. 2, 1869.

Witnesses,
R. Carlton Overton
James D. Call

Inventor
John Johnson

United States Patent Office.

JOHN JOHNSON, OF SACO, MAINE.

Letters Patent No. 86,553, dated February 2, 1869; antedated January 30, 1869.

IMPROVEMENT IN MODE OF COLLECTING THE EXUDABLE PRODUCTS OF PINE TREES

The Schedule referred to in these Letters Patent and making part of the same.

*To all whom it may concern:*

Be it known that I, JOHN JOHNSON, of the city of Saco, in the county of York, in the State of Maine, have invented a new and improved Mode or Process for Conveying and Gathering the Exudable Products from Pine Trees, or Conifers; and I do hereby declare that the following is a full and exact description thereof, reference being had to the accompanying drawings, making part of this specification.

The nature of my invention consists in providing a suitable metallic conductor and receptacle for the gathering of exudable products from conifers, and in inserting the tube in such a manner as that it shall be air-tight, and be firmly in place for conducting the outflowing exudation to the receptacle, or holder.

Figure 1 shows a section of a tree in elevation, with the metallic conductor inserted therein.

The drawing shows, at $a$, a bend or trap, which, on filling with turpentine, (as is shown in fig. 3,) will prevent air passing, and consequent oxidation.

The receptacle or container is shown at $b$.

A small air-vent is shown at $c$, if needed.

Figure 1:
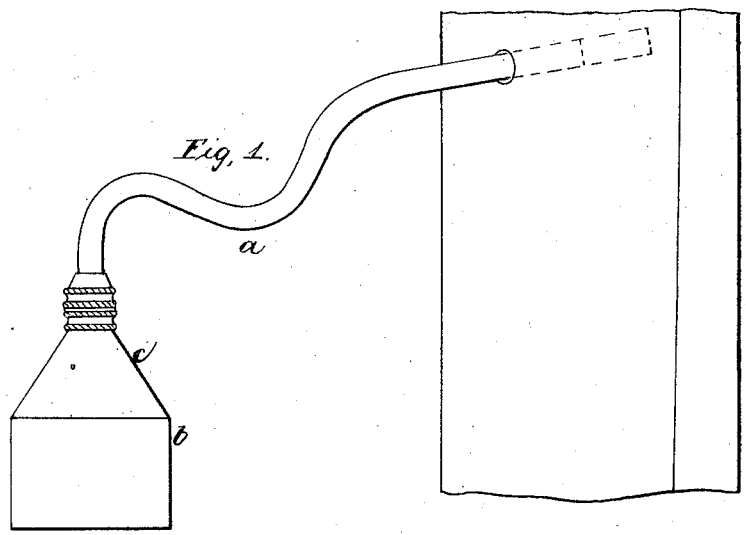
Figure 2:
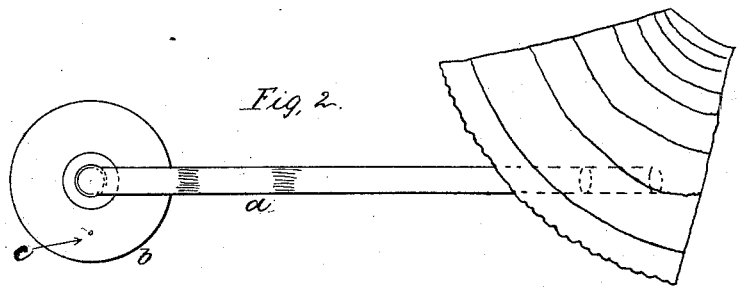
Figure 2 shows a section, in plan, and indicates, by dotted line, that by auger the wood is removed nearly concentrically, and sufficiently far to insure a full flow of turpentine to the tube, and thence to container.
Figure 3:
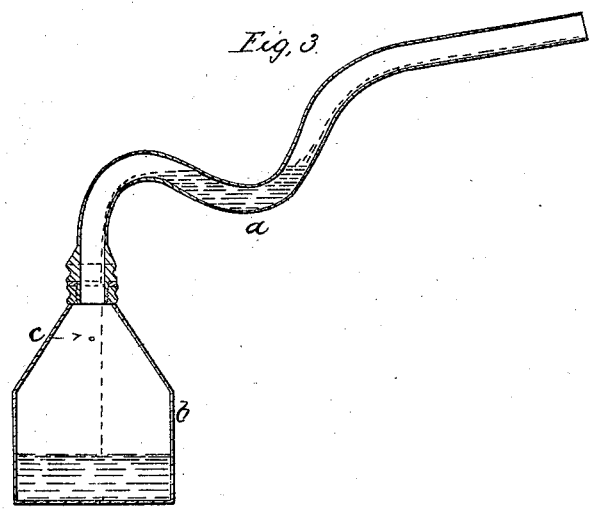
Figure 3 shows a section, in elevation, of conductor and container, and indicates the outflow and gathering, ready for removal.

What I claim, and desire to secure by Letters Patent, is—

1. The application and use of the apparatus herein described, when employed for gathering the exudations from conifers.

2. I further claim the method of collecting and preserving the products of resinous trees, with little or no loss by evaporation, or otherwise, as herein set forth.

JOHN JOHNSON.

Witnesses:
R. CARLTON OVERTON,
JAMES D. HALL.